March 19, 1940. D. G. SMELLIE 2,193,989
CORD HOOK
Filed Sept. 23, 1937 2 Sheets-Sheet 1

INVENTOR
Donald G. Smellie
BY
Harry S. Demarse
ATTORNEY

March 19, 1940. D. G. SMELLIE 2,193,989
CORD HOOK
Filed Sept. 23, 1937 2 Sheets-Sheet 2
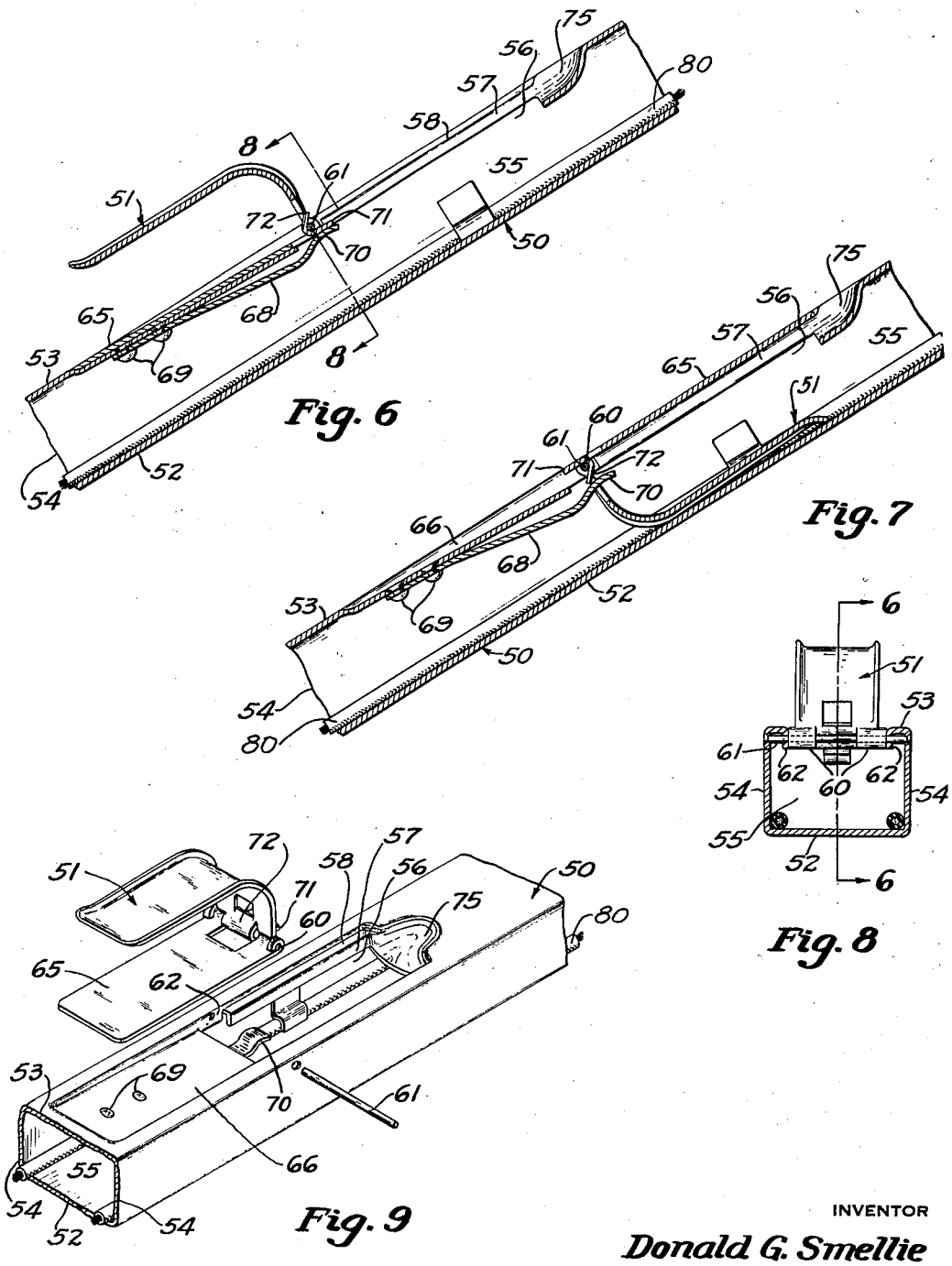
INVENTOR
Donald G. Smellie
BY
Harry S. Demaree
ATTORNEY Patented Mar. 19, 1940

2,193,989

UNITED STATES PATENT OFFICE 2,193,989

CORD HOOK

Donald G. Smellie, Canton, Ohio, assignor to The Hoover Company, North Canton, Ohio, a corporation of Ohio Application September 23, 1937, Serial No. 165,338

6 Claims. (Cl. 242—85)

This invention relates to a cord hook and a support therefor, and an object of the invention is to provide a new and improved device of this character.

Another object is to provide a cord hook pivotally mounted on a support provided with a hollow portion to receive and conceal the hook when in cord release position.

A further object is to provide a cord hook pivotally mounted on a support provided with a hollow portion to receive and conceal the hook, the latter releasing the cord during movement from cord supporting position to its cord release position in the hollow portion of the support.

Another object of the invention is to provide a cord hook pivotally mounted on a support provided with a hollow portion to receive and conceal the hook when in cord release position, and means for covering the hollow portion of the support when the hook is disposed therein.

A further object is to provide a cord hook for a portable motor driven device having a handle provided with a hollow portion, the hook being pivoted on the top surface of the handle and movable into the hollow portion of the handle to conceal the hook and to provide an uninterrupted smooth surface along the top of the handle.

Other objects and advantages of the invention will become apparent from the following specification and drawings wherein:

Fig. 6 is a section along the line 6—6 of Fig. 8 of another embodiment of the invention, showing the hook in cord supporting position;

Fig. 7 is a view similar to Fig. 6 but showing the hook in cord release position and concealed in the cleaner handle;

Fig. 8 is a section along the line 8—8 of Fig. 6; and

Fig. 9 is an exploded perspective view of the cord hook removed from the cleaner handle.

Figure 1:
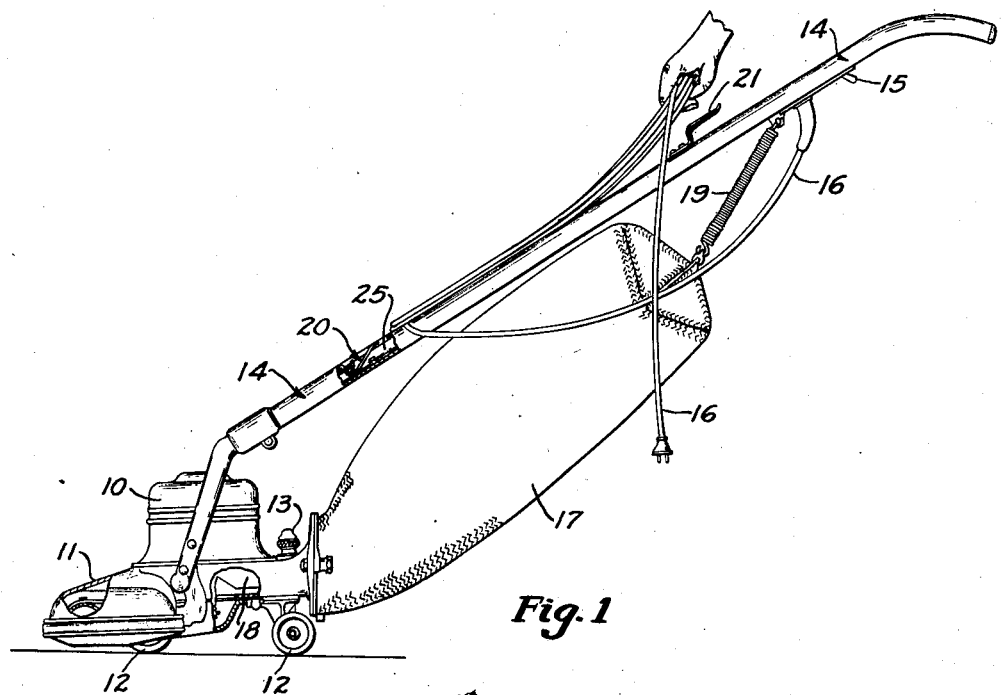
Fig. 1 is a side elevation of a suction cleaner embodying one modification of the cord hook herein shown in cord release position and concealed within the cleaner handle.

An embodiment of the invention is herein disclosed in a suction cleaner having a motor housing 10, carried by a main cleaner body 11 supported on wheels 12 provided with adjusting means 13 to raise and lower the cleaner nozzle with respect to the surface being cleaned. A cleaner handle 14 is pivotally mounted on the cleaner body 11 and is provided at its upper end with a switch 15 which controls the supply of current from an electric conducting cord 16 adapted to be connected to a source of power, and through a conductor 80 connected to the cleaner motor. A cleaner bag 17 is connected at its lower end to the exhaust passage 18 of the cleaner body 11 and is supported at its upper end by a spring 19 carried by the handle 14.

The cord 16 is supported along the upper surface of the handle 14 by a pair of hooks 20 and 21, the former being rotatably mounted at the lower end of the handle and the latter fixedly supported at the upper end. The portion of the handle adjacent the hook 20 is of rectangular cross-section having a bottom wall 22, a top wall 23 and side walls 24 cooperating to define a hollow portion 25 to receive and conceal the hook 20 when in cord release position. An elongated opening 26 is provided in the top wall 23 to permit the hook 20 to enter the hollow portion of the handle.

Figures 4, 5:
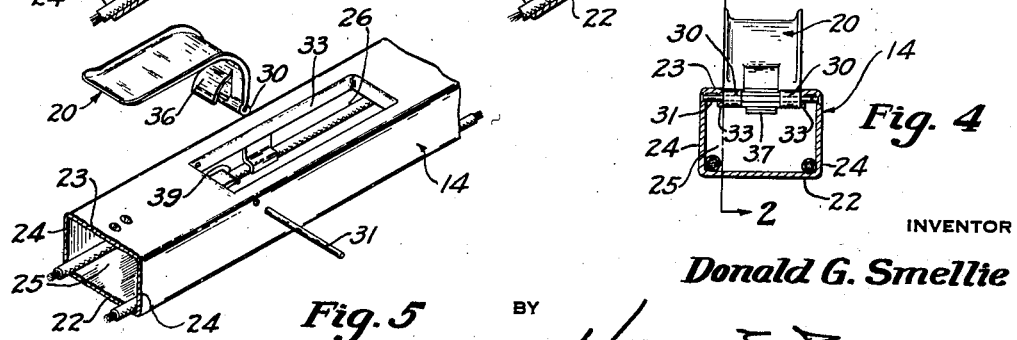
Fig. 4 is a section along the line 4—4 of Fig. 2.
Fig. 5 is an exploded perspective view showing the cord hook removed from the cleaner handle.

The hook 20 may be stamped out of sheet metal and is provided at its pivoted end with a pair of spaced integrally formed openings 30 accommodating a pin 31 to pivotally mount the hook thereon. As shown in Fig. 4 the pivot pin has its ends supported in the side walls 24 of the handle and intermediate its ends is supported by the depending side flanges 33 of the opening 26.

Figures 2, 3:
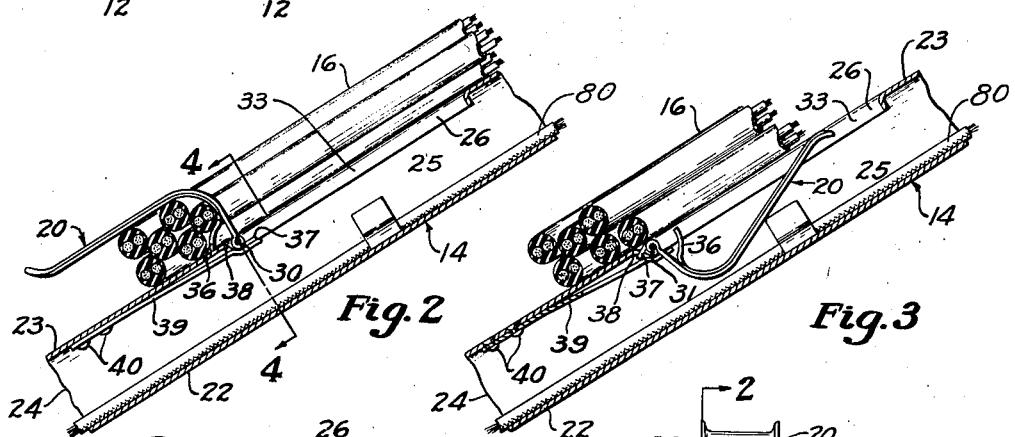
Fig. 2 is a section along the line 2—2 of Fig. 4 showing the hook in cord supporting position.
Fig. 3 is a section along the cleaner handle showing the hook in cord release position to permit the free release of the cord from the cleaner handle.

As shown in Figure 2 a portion of the hook has been struck out at 36 for engagement with the top wall 23 of the cleaner handle to limit movement of the hook to cord supporting position. Another portion of the hook has been struck out to provide a tab 37 which abuts the depending flange 38 at the bottom of the opening 26 to limit the movement of the hook 20 inwardly of the handle 14 to cord release position, illustrated in Figure 3. When the hook 20 is in cord release position it is concealed in the hollow portion 25 of the handle 14 and no part of the hook protrudes above the top surface 23 of the handle. In order to hold the hook in cord release and in cord supporting positions a leaf spring 39 is secured to the inner surface of the top wall 23 of the handle by means of rivets 40, the spring operating to exert a pressure on the tab 37 to hold the hook in cord supporting position, and when the hook is rotated to cord release position within the handle 14 the spring exerts a pressure on the tab 37, as indicated in Figure 3, to hold the hook within the handle 14 in cord release position.

Figure 5 illustrates one method of assembling the hook in the handle and consists in riveting the spring 39 to the upper wall of the handle, aligning the openings 30 in the hook with the openings in the handle and then inserting the pin 31 therethrough to pivotally secure the hook to the handle.

In order to support the cord 16 about the hooks 20 and 21, the hook 20 is rotated about the pivot pin 31 from its concealed position in the handle 14, shown in Figure 3, to cord supporting position shown in Figure 2. In this position the spring 39 bears against the tab 37 to hold the hook in cord supporting position, and the cord may be looped about the hooks 20 and 21 in the customary manner. When it is desired to release the cord from its supporting elements, the hook 20 is swung about the pin 31 to its inoperative position indicated in Figure 3, whereupon the operator may grasp the cord looped about the upper hook 21 to completely remove the cord from the handle 14. It will be noted that the cord looped around the lower hook is automatically removed from the hook 20 as the latter is rotated from cord supporting position into the hollow portion 25 of the handle 14. The member 36 prevents the cord looped around the hook 20 from fouling the pivot connection as indicated in Figure 2.

Another embodiment of the invention is shown in Figures 6 through 9 and comprises a handle 50 adapted to operate the suction cleaner shown in Figure 1. Rotatably mounted at the lower end of the handle is a cord hook 51 and fixedly secured at the upper end is another hook, not shown, for supporting the usual electric cord. The portion of the handle adjacent the hook 51 is of rectangular cross-section having a bottom wall 52, a top wall 53 and side walls 54 cooperating to define a hollow portion 55 to receive and conceal the hook 51 when in cord release position, shown in Figure 7. In the top wall of the handle is an elongated opening 56, communicating with the hollow portion 55 which is provided with parallel side flanges 57 depending from recessed shoulders 58.

The hook 51 may be stamped out of sheet metal and has a pair of integrally formed openings 60 accommodating a pin 61 to pivotally support the hook thereon. As shown in Figure 8 the pivot pin 61 is supported at its ends in the side walls 54 of the cleaner handle, and intermediate its ends in the depending flanges 62. Formed integrally with the hook 51 is a member 65 which is received in a recessed portion 66 of the top wall 53 to limit the movement of the hook to cord supporting position. When the hook is in cord release position the member 65 rests on the shoulders 58 of the opening 56 to cover the latter and to conceal the hook in the hollow portion 55 of the handle 50, the cover plate 65 also limiting movement of the hook in its cord release position by engagement with the shoulders 58 as shown in Figure 7.

A leaf spring 68 is secured to the handle 50 by means of rivets 69 and its free end 70 exerts a pressure on a tab 71 struck out from the hook 51 to hold the latter in cord supporting position as shown in Figure 6. When the hook is in cord release position the spring 68 exerts pressure on another struck out portion 72 of the hook 51 to hold the latter in cord release position.

Figure 9 illustrates a method of assembling the hook 51 in the handle and consists in riveting the spring 68 to the upper wall of the handle 50, aligning the openings of the hook with the openings in the handle and inserting the pivot pin 61 therethrough to pivotally secure the hook to the handle.

In operation, assume the hook 51 is in cord release position shown in Figure 7 and it is desired to support the cord from the hooks, the operator inserts a finger in the thumb hole 75 in the handle and grasps the cover plate 65 rotating it and the hook to cord supporting position shown in Figure 6. The cover plate 65 rests in the recessed portion 66 of the handle to limit movement of the handle to cord supporting position, and the cord may then be looped about the hooks in the customary manner. When it is desired to release the cord, the lower hook 51 is rotated about the pivot 61 to its cord release position within the hollow portion 55 of the handle, and the member 65 rests upon the shoulders 58 to limit movement of the hook and also close the opening 56 to conceal the hook 51 in the handle.

From the foregoing it will be perceived that when the hook is in cord release position it is concealed within the hollow portion of the handle to provide an uninterrupted smooth surface along the top wall of the handle, whereby the hook cannot scratch the furniture under which the cleaner is operating.

I claim:

1. In a portable motor driven device, a conductor cord for connecting the device to a power source, a handle for operating said device, said handle having an opening in the upper surface of said handle communicating with a hollow portion in said handle, a cord hook, means for pivotally mounting said hook on the upper surface of said handle for releasably supporting said cord on said handle, said mounting means being so constructed that said hook may move from cord supporting position through said opening into said hollow portion of said handle in a direction to automatically release said cord from said hook to provide an uninterrupted surface along the upper surface of said handle, and a member movable to cover said opening and said hook in said handle.

2. In a portable motor driven device, a conductor cord for connecting the device to a power source, a handle for operating said device, said handle having an opening communicating with a hollow portion in said handle, a hook pivoted on said handle and movable to a position for supporting said cord on said handle and movable therefrom through said opening into said hollow portion of said handle to cord release position, and a member forming part of said hook and movable therewith for closing said opening when said hook is in said hollow portion of said handle, said closure member being engageable with said handle to limit movement of said hook to its cord engaging position.

3. In combination with a handle, a fixed cord hook mounted on said handle, a movable cord hook pivotally mounted on said handle and spaced from said fixed hook, a cord supported by said hooks, means defining an elongated recess in said handle and interposed between said hooks whereby the span of said cord includes said recess, said pivotally mounted hook being movable out of said recess and away from said fixed hook to support said cord on said hook, and movable towards said fixed hook into said recess to automatically release the cord therefrom, whereby said cord can be removed as a unit from said fixed hook.

4. In a portable motor driven device, a cord for connecting the device to a power source, a handle for operating said device, a cord hook, means for pivotally mounting said hook on said handle, means defining a recess in said handle to completely receive said hook therein, said hook being movable to a position exteriorly of said handle whereby said cord may be looped thereon to support said cord, said mounting means being arranged with respect to said recess for movement of said hook into said recess in a direction to automatically release said cord therefrom as said hook moves into said recess, said hook disappearing completely within said recess so as to be out of contact with said cord.

5. In combination, a support having a recess, a cord hook pivotally mounted on said support, said hook being movable to project from said support for supporting a cord, and movable into said recess to effect release of the cord, and cover means engageable with said support when said hook is in cord supporting position and movable with said hook for closing said recess when said hook is in said recess in cord release position.

6. In combination, a support having an open-mouthed recess, a cord hook adapted to support a cord thereon, means for pivotally mounting said hook on said support adjacent an edge of said recess, said hook being movable to a position exteriorly of said support for supporting a cord therefrom about said recess, said mounting means being arranged with respect to said recess for movement of said hook from said cord supporting position into said recess in a direction to release the cord therefrom as said hook moves into said recess.

DONALD G. SMELLIE.